(12) United States Patent
Blackmon et al.

(10) Patent No.: US 7,446,167 B2
(45) Date of Patent: Nov. 4, 2008

(54) CATALYST DEACTIVATION AGENTS AND METHODS FOR USE OF SAME

(75) Inventors: Kenneth P. Blackmon, Houston, TX (US); Joseph L. Thorman, League City, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/279,603

(22) Filed: Apr. 13, 2006

(65) Prior Publication Data
US 2007/0244273 A1 Oct. 18, 2007

(51) Int. Cl.
*C08F 6/02* (2006.01)
*C08F 10/06* (2006.01)

(52) U.S. Cl. .......... 528/495; 528/491; 526/64; 526/82; 526/84

(58) Field of Classification Search .......... 526/82, 526/84, 64; 528/486, 495, 499, 491
See application file for complete search history.

(56) References Cited

U.S. PATENT DOCUMENTS

| | | | | |
|---|---|---|---|---|
| 2,924,594 | A * | 2/1960 | Breslow | 526/160 |
| 2,940,963 | A * | 6/1960 | Denkowski | 528/496 |
| 3,499,880 | A * | 3/1970 | Abraham | 528/486 |
| 3,687,920 | A | 8/1972 | Johnson | |
| 4,086,408 | A | 4/1978 | Karol et al. | |
| 4,101,445 | A | 7/1978 | Levine et al. | |
| 4,211,863 | A * | 7/1980 | McDaniel et al. | 528/483 |
| 4,298,718 | A | 11/1981 | Mayr et al. | |
| 4,376,191 | A | 3/1983 | Geck | |
| 4,430,488 | A | 2/1984 | Zboril | |
| 4,482,687 | A | 11/1984 | Noshay et al. | |
| 4,544,717 | A | 10/1985 | Mayr et al. | |
| 4,551,509 | A * | 11/1985 | Takayuki et al. | 526/68 |
| 4,560,671 | A | 12/1985 | Gross et al. | |
| 4,649,128 | A | 3/1987 | Rekers et al. | |
| 4,701,432 | A | 10/1987 | Welborn, Jr. | |
| 4,701,489 | A | 10/1987 | Hughes et al. | |
| 4,719,193 | A | 1/1988 | Levine et al. | |
| 4,733,005 | A | 3/1988 | Schmidt et al. | |

(Continued)

FOREIGN PATENT DOCUMENTS

WO  WO 2004/000895 A1  12/2003

OTHER PUBLICATIONS

Hawley's Condensed Chemical Dictionary, 14th edition, J. Wiley & Sons, Inc., 2002 p. 1/1.*

*Primary Examiner*—Fred M Teskin
(74) *Attorney, Agent, or Firm*—Tenley R. Krueger (57) ABSTRACT

A method of deactivating a polymerization catalyst system comprising contacting the catalyst system with a catalyst deactivation agent wherein the catalyst system comprises an alkyl aluminum cocatalyst and the reaction of the catalyst system and catalyst deactivation agent produces reaction products that are noncorrosive, nongelatinous, or both. A method of inhibiting the polymerization of propylene comprising contacting a polymerization catalyst system with a catalyst deactivation agent wherein the catalyst system comprises an alkyl aluminum cocatalyst and the reaction of the cocatalyst and the catalyst deactivation agent produces reaction products that are noncorrosive, nongelatinous, or both. A method of deactivating a polymerization catalyst system having an alkyl aluminum cocatalyst, comprising contacting the catalyst system with an alcohol, a carboxylic acid, an alkylene glycol, or combinations thereof.

14 Claims, 4 Drawing Sheets

U.S. PATENT DOCUMENTS

| | | |
|---|---|---|
| 4,755,495 A | 7/1988 | Cann et al. |
| 4,987,200 A | 1/1991 | Datta et al. |
| 5,019,633 A | 5/1991 | Wagner et al. |
| 5,070,055 A | 12/1991 | Schramm et al. |
| 5,118,757 A | 6/1992 | McCullough, Jr. |
| 5,158,920 A | 10/1992 | Razavi |
| 5,229,022 A | 7/1993 | Song et al. |
| 5,416,228 A | 5/1995 | Ewen et al. |
| 5,527,752 A * | 6/1996 | Reichle et al. .............. 502/117 |
| 5,731,381 A * | 3/1998 | Apecetche et al. ............ 526/83 |
| 5,789,502 A | 8/1998 | Shamshoum et al. |
| 5,807,800 A | 9/1998 | Shamshoum et al. |
| 5,968,864 A | 10/1999 | Shamshoum et al. |
| 6,180,730 B1 | 1/2001 | Sibtain et al. |
| 6,225,251 B1 | 5/2001 | Shamshoum et al. |
| 6,300,420 B1 | 10/2001 | Jaaskelainen et al. |
| 6,432,860 B1 | 8/2002 | Shamshoum et al. |
| 6,916,892 B2 | 7/2005 | Tharappel et al. |
| 2006/0041088 A1 | 2/2006 | Nagy et al. |

\* cited by examiner

CATALYST DEACTIVATION AGENTS AND METHODS FOR USE OF SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present disclosure relates to compounds and methods for deactivation of catalysts and catalyst system components. More specifically, the present disclosure relates to compounds and methods for deactivation of polymerization catalysts and their components.

2. Background of the Invention

Polypropylene is among the most versatile and commonly used thermoplastic in the world today. Polypropylene may be produced using loop reactors wherein a continuous polymerization process occurs. A monomer stream may be introduced into the loop reactor and then circulated with an appropriate catalyst system to produce the polypropylene. Such catalyst systems must be deactivated after the polymerization reaction is complete to prevent unwanted downstream reactions. For example, the catalysts may be deactivated by contact with water. In the case of Ziegler-Natta catalysts, contact with water to deactivate the catalyst may result in the production of HCl, which may corrode the polymerization reactor or other mechanical system components resulting in the need for costly equipment repairs.

Thus an ongoing need exists for other compounds and methods for use in the deactivation of a polymerization catalyst.

BRIEF SUMMARY OF SOME OF THE PREFERRED EMBODIMENTS

Disclosed herein is a method of deactivating a polymerization catalyst system comprising contacting the catalyst system with a catalyst deactivation agent wherein the catalyst system comprises an alkyl aluminum cocatalyst and the reaction of the catalyst system and catalyst deactivation agent produces reaction products that are noncorrosive, nongelatinous, or both.

Also disclosed herein is a method of inhibiting the polymerization of propylene comprising contacting a polymerization catalyst system with a catalyst deactivation agent wherein the catalyst system comprises an alkyl aluminum cocatalyst and the reaction of the cocatalyst and the catalyst deactivation agent produces reaction products that are noncorrosive, nongelatinous, or both.

Further disclosed herein is a method of deactivating a polymerization catalyst system having an alkyl aluminum cocatalyst, comprising contacting the catalyst system with an alcohol, a carboxylic acid, an alkylene glycol, or combinations thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Disclosed herein are compounds for the deactivation of catalyst systems such as polymerization catalyst systems. Such compounds are collectively termed herein, catalyst deactivation agents (CDAs). A catalyst system herein refers to one or more chemical agents which operate in concert to increase the rate of a reaction. Herein the CDA refers to a compound that when contacted with the catalyst system deactivates at least one component of the system and renders the catalyst system unable to carry out the polymerization of monomeric units. Herein, the terms deactivate, quench, and kill all refer to the action of rendering the catalyst system unable to carry out the polymerization of monomeric units through the reduction or elimination of catalytic activity. In some embodiments wherein the catalyst system comprises a catalyst and a cocatalyst the CDA may function to deactivate the catalyst, the cocatalyst or both. For example, in a Ziegler-Natta catalyst system comprising a transition metal compound, hereafter referred to as the Ziegler-Natta catalyst, and an alkyl aluminum cocatalyst, the CDA may deactivate the alkyl aluminum cocatalyst as will be described in more detail herein. Also disclosed are methods of using such CDAs. In an embodiment, a polymerization catalyst may be deactivated by the introduction of a CDA to a reactor component in which a polymerization reaction (e.g., an alpha-olefin to polyolefin) is occurring. The reaction of the CDA with the polymerization catalyst may result in nongelatinous catalyst deactivation products that remain with the polymerization product or enter a process stream as will be described in detail later. Herein a nongelatinous catalyst deactivation product does not promote formation of a gel wherein a gel is defined herein as a colloid consisting of a solid and a liquid that are dispersed evenly throughout a material and have set to form a jellylike mass. In an embodiment, a nongelatinous catalyst deactivation product results in the reduced fouling of downstream components of a polymerization reaction system such as for example getter beds, blowers, condensers, and regulators.

In an embodiment, the CDA functions to deactivate a polymerization catalyst system. Polymerization catalyst systems are well known in the art and include for example and without limitation Ziegler-Natta catalyst systems and metallocene systems. In an embodiment, the polymerization catalyst system is a Ziegler-Natta catalyst system comprising a Ziegler-Natta catalyst and an alkyl aluminum cocatalyst.

Ziegler-Natta catalysts are stereospecific heterogeneous systems formed from a transition metal halide and a metal alkyl or hydride. In an embodiment, the Ziegler-Natta catalyst is derived from a halide of a transition metal, such as titanium, chromium or vanadium. The Ziegler-Natta catalyst may be a supported catalyst. Examples of suitable support materials include without limitation silica and magnesium compounds, such as magnesium halides, dialkoxymagnesium, alkoxymagnesium halides, dialkylmagnesium, magnesium oxide, magnesium hydroxide, and carboxylates of magnesium. In an embodiment, the Zeigler-Natta catalyst is comprised of a titanium halide supported on a magnesium compound such as titanium tetrachloride ($TiCl_4$) supported on an active magnesium dihalide such as magnesium dichloride or magnesium dibromide. The supported Ziegler-Natta catalyst may be employed in conjunction with a co-catalyst such as an alkylaluminum compound, for example, triethylaluminum (TEA1 or $AlEt_3$), trimethyl aluminum (TMA) and triisobutyl aluminum (TIBAL).

A Ziegler-Natta catalyst may be used in conjunction with one or more internal electron donors. In an embodiment, these internal electron donors are added during the preparation of the catalysts and may be combined with the support or otherwise complexed with the transition metal halide. Ziegler-Natta catalysts may also be used in conjunction with one or more external donors. Without wishing to be limited by theory, such external donors may act as stereoselective control agents to control the amount of atactic or non-stereoregular polymer produced during the reaction. Examples of external donors include without initiation the organosilicon compounds such as cyclohexylmethyl dimethoxysilane (CMDS), dicyclopentyl dimethoxysilane (CPDS) and diisopropyl dimethoxysilane (DIDS).

In an embodiment, the polymerization catalyst system is a metallocene catalyst system comprising a metallocene catalyst and an alkyl aluminum cocatalyst. Metallocenes can be characterized generally as coordination compounds incorporating one or more cyclopentadienyl (Cp) groups (which may be substituted or unsubstituted and may be the same or different) coordinated with a transition metal through X bonding. The Cp groups may also include substitution by linear, branched or cyclic hydrocarbyl radicals and desirably cyclic hydrocarbyl radicals so as to form other contiguous ring structures, including, for example indenyl, azulenyl and fluorenyl groups. These additional ring structures may also be substituted or unsubstituted by hydrocarbyl radicals and desirably C1-C20 hydrocarbyl radicals. Metallocene compounds may be combined with an activator and/or cocatalyst (as described previously) or the reaction product of an activator and/or cocatalyst, such as for example methylaluminoxane (MAO) and optionally an alkylation/scavenging agent TEA1. Various types of metallocenes are known in the art, which may be supported. Typical supports may be any support such as talc, an inorganic oxide, clay, and clay minerals, ion-exchanged layered compounds, diatomaceous earth, silicates, zeolites or a resinous support material such as a polyolefin. Specific inorganic oxides include silica and alumina, used alone or in combination with other inorganic oxides such as magnesia, titania, zirconia and the like. Non-metallocene transition metal compounds, such as titanium tetrachloride, may also be incorporated into the supported catalyst component.

Ziegler-Natta catalyst systems and methods for the preparation and use of same are disclosed in, U.S. Pat. Nos. 4,298,718; 4,544,717; 4,701,432; 4,987,200; 3,687,920; 4,086,408; 4,376,191; 5,019,633; 4,482,687; 4,101,445; 4,560,671; 4,719,193; 4,755,495; and 5,070,055, each of which is incorporated by reference herein in its entirety. Metallocene catalyst systems and methods for the preparation and use of same are disclosed in U.S. Pat. Nos. 5,158,920, 5,416,228, 5,789,502, 5,807,800, 5,968,864, 6,225,251, and 6,432,860, each of which are incorporated herein by reference.

In an embodiment, the CDA is a nonaqueous compound, alternatively an oxygen-containing protic compound, alternatively an alcohol, or combinations thereof.

In an embodiment, the CDA is an oxygen-containing protic compound such as an alcohol, carboxylic acid or combinations thereof. In another embodiment, the CDA is an alcohol, alternatively a diol, alternatively a triol, alternatively a compound containing more than three hydroxyl group functionalities, or combinations thereof. The CDA may further comprise water in combination with the previously disclosed compounds.

Examples of suitable alcohols include without limitation glycerin, ethylene glycol, propylene glycol, diethylene glycol, dipropylene glycol, tetrapropylene glycol, hexaethylene glycol, decapropylene glycol, ethylene glycol monomethyl ether, ethylene glycol monopropyl ether, tripropylene glycol monooctyl ether, ethylene glycol monoacetate, tetraethylene glycol monohexanoate, or combinations thereof. In an embodiment the CDA is propylene glycol, alternatively di(propylene glycol).

In an embodiment, the CDAs disclosed herein are used to deactivate a Ziegler-Natta catalyst system comprising a transition metal halide and an alkyl aluminum cocatalyst, alternatively, a metallocene catalyst system comprising a metallocene catalyst and an alkyl aluminum cocatalyst, alternatively a supported transition metal halide and an alkyl aluminum cocatalyst, alternatively a supported transition metal halide, an alkyl aluminum cocatalyst and an internal electron donor, alternatively a supported transition metal halide, an allyl aluminum cocatalyst, an internal electron donor and an external electron donor. In an embodiment, a CDA is used to deactivate a Ziegler-Natta catalyst system comprising $TiCl_4$ and TEA1. Without wishing to be limited by theory, a CDA comprising an oxygen-containing protic compound such as an alkylene glycol may react with a Ziegler-Natta cocatalyst such as TEA1 to produce aluminum alkoxy/hydroxy compounds and an alkane. The aluminum alkoxy/hydroxy compounds cannot function as an effective cocatalyst and thus the polymerization catalyst is deactivated.

In an embodiment, the CDA is used to deactivate a polymerization catalyst system after the preparation of an alpha-olefin polymer, alternatively after the preparation of a propylene polymer (PP). The PP may be a copolymer, for example a copolymer of propylene with ethylene or one or more alpha-olefin monomers such as butene, hexene, etc. Alternatively, the PP is a homopolymer.

The polymerization of propylene into a random copolymer with ethylene or an alpha-olefin or a homopolymer may be carried out under suitable reaction conditions for polymerization thereof Such conditions are known to one of ordinary skill in the art and are described U.S. Pat. Nos. 4,298,718 and 4,544,717, which have been previously disclosed.

In an embodiment, the PP may also comprise additives as deemed necessary to impart the desired physical properties. Examples of additives include without limitation stabilizers, antiblocking agents, slip additives, antistatic agents, ultraviolet screening agents, oxidants, anti-oxidants, ultraviolet light absorbents, fire retardants, processing oils, coloring agents, pigments/dyes, fillers, and/or the like with other components. The aforementioned additives may be used either singularly or in combination to form various formulations of the polymer. For example, stabilizers or stabilization agents may be employed to help protect the polymer resin from degradation due to exposure to excessive temperatures and/or ultraviolet light. These additives may be included in amounts effective to impart the desired properties. Effective additive amounts and processes for inclusion of these additives to polymeric compositions are known to one skilled in the art. In an embodiment, one or more additives are added to the polymer (eg polypropylene) after the addition of a CDA to the polymerization process.

Figure 1:
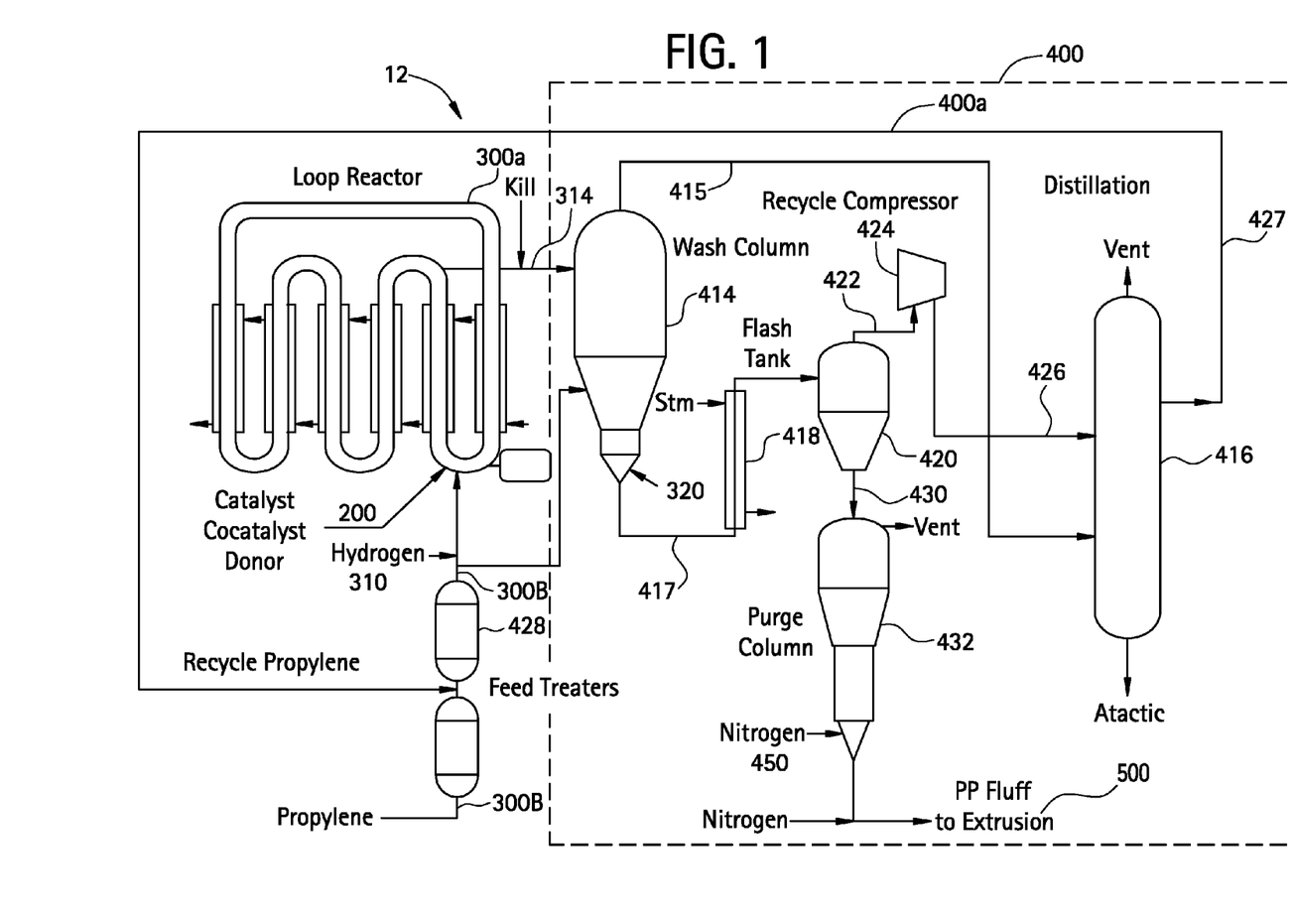
FIG. 1 is a process flow diagram of a bulk loop reactor system.

In an embodiment, the CDAs disclosed herein are used to deactivate a Ziegler-Natta catalyst system after a polymerization reaction such as the polymerization of propylene. Polypropylene is typically produced in continuous polymerization systems that may include loop reactors. An example of a bulk loop reactor system 12 suitable for propylene polymerization using one or more Zeigler-Natta catalyst systems is illustrated in FIG. 1. The bulk loop reactor system 12 includes a catalyst mixing and injection system upstream of and in communication with a loop reactor 300A, and a polymer recovery system 400A downstream of the loop reactor 300A. It will be understood that the bulk loop reactor system 12 may include a single loop reactor or multiple loop reactors and one or more other olefin polymerization reactors, such as other propylene polymerization reactors or pre-polymerization reactors. In the embodiment shown in FIG. 1, the bulk loop reactor system 12 comprises one or more feed treaters 428 in communication with a loop reactor 300A. The polymer recovery system 400A may comprise a wash column 414, a flash tank 420, a recycle compressor 424, a purge column 432 and a distillation vessel 416. In the embodiment shown in FIG. 1, the polymer recovery system 400A comprises a wash column 414 and a flash tank 420 located upstream. The flash tank 420 is in communication with a recycle compressor 424 and a purge column 432 both of which are located downstream of the flash tank 420. The recycle compressor 424 in turn is in communication with a distillation vessel 416 that is downstream of the recycle compressor 424.

In an embodiment, liquid monomer propylene is introduced to the bulk loop reactor via conduit 300B, which may then be passed through feed treaters 428 which function to filter impurities that may adversely affect the polymerization reaction. The bulk loop reactor may also allow for the addition of hydrogen via conduit 310 and a system of preparing and introducing the polymerization catalyst system to the polymerization reactor. In some embodiments, the bulk loop reactor system may comprise a purge conveyor.

In an embodiment, the polymerization catalyst system is introduced to the polymerization reactor using a mixing and injection system. The catalyst mixing and injection system may include a mixing vessel comprising a mixing paddle and heating jacket. A high molecular weight mineral oil and the Ziegler-Natta catalyst are introduced into the mixing vessel. Generally the high molecular weight oil is heated to a sufficient temperature, which in an embodiment is in the range of from about 30° C. to at least 90° C. depending upon the type of mineral oil used, to reduce the viscosity of the mineral oil and allow the mixing paddle to sufficiently mix the Ziegler-Natta catalyst and high molecular weight mineral oil. The heated mixture of high molecular weight mineral oil and Ziegler-Natta catalyst is then conveyed to an injector where it may cool and form a "paste." The paste may then be conveyed into another mixing vessel wherein a co-catalyst, such as TEA1, and one or more electron donors may be blended with the paste. The resulting mixture of Ziegler-Natta catalyst, co-catalyst and electron donor exits the mixing vessel into the polymerization loop reactor 300A containing liquid propylene monomer via conduit 200. Liquid propylene monomer is polymerized into polypropylene, which eventually begins to form granules. As propylene polymerization continues in the loop reactor, the propylene polymer granules increase in size. When the propylene polymer granules are of the size desired by the user they may be conveyed via conduit 314 into the polymer recovery system.

In general, propylene polymer granules separate from the liquid propylene in the wash column 414. In some instances, additional liquid propylene entering at or near the base of the wash column 414 via conduit 320 passes through the bed of settling propylene polymer granules. Liquid propylene monomer and a portion of the polymerization by-products exit the wash column 414 overhead via the conduit 415 and are conveyed to a distillation vessel 416. The distillation vessel separates the liquid propylene from polymerization by-products, such as atactic polypropylene.

The remaining propylene polymer granules, propylene monomer and polymerization by-products exit the wash column 414 at the base via conduit 417 and enter the heating column 418. The propylene polymer granules may exit the wash column 414 continuously or in batches. Sufficient heat is applied to the propylene polymer granules such that upon entering die flash tank 420, a substantial portion of the liquid propylene monomer accompanying the propylene polymer granules vaporizes, thus separating from the granules. The gaseous propylene and other polymerization by-products are extracted from the flash tank 420 via the conduit 422. The gaseous propylene may be recompressed by the recycle compressor 424 and conveyed via conduit 426 to the distillation vessel 416. Liquid propylene monomer exits the distillation vessel via conduit 427 and may be conveyed to one or more propylene feed treaters 428 wherein the propylene may be filtered before being returned to the loop reactor 300A. The propylene polymer granules exit the flash tank 420 via conduit 430 and enter the purge column 432 where it is purged with $N_2$ fed to the purge column 432 via conduit 450. Upon exiting the purge column 432, the propylene polymer granules may be directed to extruders for processing into pellets as previously described.

The CDA may be introduced to the polymerization reactor at any point in the polymerization process desired by the user and compatible with the reaction conditions. Referring again to FIG. 1, in an embodiment the active catalyst system present in the propylene polymer granules exiting the loop reactor 300A via conduit 314 may be deactivated prior to entering the wash column 414 by the introduction of a CDA into conduit 314.

In an embodiment, the CDA reacts with the cocatalyst of the Ziegler-Natta catalyst system. The cocatalyst may be an alkyl aluminum compound as previously disclosed herein. In an embodiment, the CDA reacts with a Ziegler-Natta alkyl aluminum cocatalyst (ZNAAC) to produce aluminum alkoxides that no longer function as an efficient cocatalyst as shown in equation 1.

$$AlR_3 + R'OH \rightleftarrows \begin{matrix} R_2Al(OR') \\ RAl(OR')_2 \\ Al(OR')_3 \end{matrix} \quad (1)$$

The physical properties of the aluminum alkoxides produced, hereafter referred to collectively as quench products, are dependent on the physical properties of the CDA. In general, the solubility of the CDA in the reaction medium may directly correlate with the solubility of the quench products in the reaction medium where the reaction solution comprises the reactants, products (i.e. propylene monomer and polypropylene granules). For example, a CDA having a high solubility in the reaction medium may produce quench products with moderate to high solubility in the reaction medium. Such quench products would remain liquid under the polymerization reaction conditions. In an embodiment, referring again to FIG. 1, a CDA having a high solubility in the reaction medium may enter the polymer recovery system 400A and separate from the polymer granules in the wash column 414 via conduit 415 before being conveyed to a distillation vessel 416. Use of CDA that remains liquid under the disclosed conditions may be advantageous. For example, a CDA that remains liquid under the disclosed conditions, such as a heavy alcohol, may allow for removal of the quench products through distillation vessel 416 as a bottom fraction thus preventing the quench products from entering the propylene recycle stream and being removed through some downstream purification process such as getter or treatment beds. Treatment beds may comprise a material which when interacted with the propylene recycle stream serves to improve the properties of said stream such as for example by removing contaminants from the propylene recycle stream. Such getter or treatment beds are known to one of ordinary skill in the art.

In a nonlimiting embodiment, the solubility of the CDA may be defined in relation to the amounts necessary to deactivate the catalyst system. For example, in a non-limiting embodiment, a low solubility CDA may be defined as having a solubility of from 0 to 40 ppm weight of the total reactor contents. The total reactor contents include both liquid propylene and polypropylene. For example, in a non-limiting embodiment, a moderate solubility CDA may be defined as having a solubility of from 40 ppm to 150 ppm weight of the total reactor contents. For example, in a non-limiting embodiment, a high solubility CDA may be defined as having a solubility of greater than 150 ppm weight of the total reactor contents. It should be noted CDA's are thought to possibly be active at concentrations that are undetectable in ppm (i.e. perhaps in ppb or even ppt) as noted in a laboratory study, below. It should also be noted that each CDA may have a different quenching ability.

In an embodiment, the CDA has moderate solubility in the reaction medium and produces quench products having moderate solubility in the reaction medium. In such an embodiment, the quench products may be distributed between the solidified polymerization product and the liquid reaction components. For example, referring to FIG. 1, a portion of the quench products may remain with the polymer granules as they exit the wash column 414 via conduit 417 and enter the heating column 418 to eventually be found with the PP Fluff 500. Quench products remaining with the liquid reaction components may be removed via distillation vessel 416 as previously described.

In an alternative embodiment, the CDA has low solubility in the reaction medium and produces quench products having low solubility in the reaction medium. The solubility of the quench products in this instance may be sufficiently low to allow the quench products to precipitate from the reaction medium. In such an embodiment, the majority of the quench products may follow the path of the polymer granules and be found in the PP Fluff 500, FIG. 1.

In an embodiment, the CDA is present in any amount sufficient to reduce the activity of the Ziegler-Natta catalyst system by greater than about 90%, alternatively greater than about 95%, alternatively greater than about 99%. The catalyst may be a polymerization catalyst system, alternatively a Ziegler-Natta catalyst system. In an embodiment, the catalyst system is a Ziegler-Natta catalyst system having an alkyl aluminum cocatalyst The molar amount of polyprotic CDA required for catalyst deactivation may be 1/x the molar amount required for a monoprotic compound where x is the number of protons in the polyprotic CDA. In such an embodiment, it is assumed that every CDA proton available can participate in reaction with a ZNACC resulting in a CDA efficiency of 1. In an embodiment, a triproticCDA interacting with the ZNACC may be present in an amount at least equimolar to the amount of ZNACC, alternatively, the CDA is present in an amount at least from 1% to 10% greater than the amount of ZNACC, alternatively at least 10% greater than the amount of ZNACC. In an example of such an embodiment, the CDA is a diprotic compound (PG) that is added in at least a concentration of 3/2 molar equivalents of ZNAAC to form quench products and deactivate the catalyst. In an alternative embodiment, the CDA is a polyprotic compound. As understood by one skilled in the art, for a polyprotic CDA, every CDA proton available may not react with a ZNAAC resulting in the efficiency of the polyprotic CDA being less than 1. In such an embodiment, the amount of polyprotic CDA necessary to effect the deactivation of the catalyst may be empirically determined. Methods for the determination of the amount of polyprotic CDA necessary to deactivate the catalyst are known to one of ordinary skill in the art. By way of example, for a catalyst system comprising from 40 ppm to 300 ppm weight with respect to the total contents of the reactor of a ZNACC, the CDA may be present in an amount of from about 70 ppm to 1100 ppm weight with respect to the total contents of the reactor.

In an embodiment, the catalyst system is a Ziegler-Natta catalyst system and the ZNAAC is TEA1. The catalyst system may be used in the production of polypropylene as described previously. In an embodiment, the CDA is propylene glycol and is introduced to a polymerization reactor at some point after polymerization of the propylene but prior to the polymer recovery system as described previously. The propylene glycol reacting with the TEA1 may produce a solid quench product with greater than 50% recovery of the theoretical aluminum in the polypropylene fluff.

In an embodiment, the catalyst system is a Ziegler-Natta catalyst system and the ZNAAC is TEA1. The catalyst system may be used in the production of polypropylene as described previously. In an embodiment, the CDA is dipropylene glycol and is introduced to a polymerization reactor at some point after polymerization of the propylene but prior to the polymer recovery system as described previously. The dipropylene glycol reacting with the TEA1 may produce a liquid quench product that may have 50% of the theoretical aluminum remaining in the polypropylene fluff while 50% of the quench product remains in the liquid process stream and can be removed via distillation. Alternatively, the product may optionally enter a getter bed designed to trap the quench products. Such getter beds are known to one of ordinary skill in the art.

In an embodiment, the CDAs disclosed herein provide an effective means of deactivating a polymerization catalyst system such as a Ziegler-Natta catalyst system. The CDA may reduce the activity of the Ziegler-Natta catalyst system by greater than about 90%, alternatively by greater than about 95%, alternatively by greater than about 99%. The CDA may react with the Ziegler-Natta catalyst system to produce non-gelatinous quench products that when situated with the polymer product does not significantly affect the physical properties of the polymer product. Furthermore, the quench products of the reaction of the CDA with the Ziegler-Natta catalyst system may not adversely affect the polymerization reactor or other system components through formation of corrosive products. Herein a corrosive product is a product that when contacted with a system component causes deterioration of useful properties of the component.

EXAMPLES

The invention having been generally described, the following examples are given as particular embodiments of the invention and to demonstrate the practice and advantages thereof. It is understood that the examples are given by way of illustration and are not intended to limit the specification of the claims in any manner. In the following examples, plant-scale polymerization reactions carried out in a bulk loop reactor were carried out using a reactor similar to that described in the specification and presented as an embodiment in FIG. 1 while laboratory scale experiments were carried out in a batch bulk-phase reactor.

Examples 1-3

Five agents were examined as possible CDAs. These agents were isopropyl alcohol (IPA), ethylene glycol (EG), propylene glycol (PG), ethylene glycol monopropylether (EP), and glycerin. With the exception of EP (ethylene glycol monopropylether), the ratio of available protons to molecular weight is lower than IPA, which means that in comparison to IPA, less mass of the CDA will be required in the process. The advantageously high boiling point of the alkylene glycols, may result in lower levels of the quench products in the flash tank overhead stream (referring to FIG. 1, flash tank 420) due to lower volatility.

A representative experiment for each of the areas of investigation will be described.

Example 1

The ability of the CDAs to quench a Ziegler-Natta catalyst system with respect to the the time of their addition to the polymerization process was investigated by conducting polymerization experiments under two conditions; the first experimental conditions involved addition of the CDA during the prepolymerization reaction, Example 2A, while the second experimental conditions involved addition of the CDA midway during the polymerization reaction, Example 2B. Standard catalyst preparation and utilization: 10 mg of Toho THC-A catalyst, 740 g of propylene, reaction temperature of 70° C., 0.09 mol % $H_2$, 1 mmol TEA1, 0.05 mmol CMDS. THC-A is an olefin polymerization catalyst commercially available from Toho Catalyst Co.

Example 2A

In this example, the effect of adding a CDA during prepolymerization was determined. These experiments are also referred to as "initial quench" experiments. The zipperclave reactor was charged with propylene (≈200 g) and hydrogen (0.09 mol % of total propylene). The vessel containing the CDA was then connected and flushed into the reactor with propylene (≈300 g). The vessel containing the hexane slurry of catalyst, TEA1, and CMDS donor was then connected and flushed into the reactor with propylene (≈240 g). To clarify the sequence, the vessel containing the CDA was connected, flushed, and then disconnected from the reactor. The catalyst vessel was then connected to the reactor and flushed, such that the catalyst did not travel through the CDA vessel. Catalyst mileage was determined by comparing the yield of the control reaction with no CDA to that yield found using the desired concentration of CDA. Catalyst mileage herein refers to the relative activity (gram of PP/gram of catalyst/hour) with respect to baseline conditions. The result of this battery of experiments, Table 2, in preventing polymerization shows the following order of ability: EP>IPA>EG>PG>$H_2O$. Note that the theoretical number of protons on each CDA molecule is used in the calculation of theoretical proton concentration available. For example, EG has two protons per molecule. In the experiment, 10 milligrams of EG in 740 grams of propylene were used resulting in 9 mmol of EG and 18 mmol of protons in the polymerization reactor. This considered, it is interesting to note that if all protons were indeed involved in quenching the polymerization reaction all of the CDAs should hold the same quenching ability. The results suggest that not all of the available protons of EG and PG are being utilized as efficiently as those of IPA and EP. The limiting case is that of water, which is only sparingly soluble in hydrocarbons, and as a result does not quench as efficiently as those molecules with higher solubility.

TABLE 1

| Alcohol | MP of alcohol (° C.) | BP of alcohol (° C.) | Odor of alcohol | Formula | MW of alcohol (g/mol) |
| --- | --- | --- | --- | --- | --- |
| Isopropanol | −89 | 82 | Alcohol | $HOCH(CH_3)_2$ | 60.1 |
| ethylene glycol | −13 | 197 | slight odor | $HOCH_2CH_2OH$ | 62.1 |
| propylene glycol | −60 | 187 | Odorless | $CH_3CH_2(OH)CH_2(OH)$ | 77.1 |
| glycerol/glycerin | 18 | 290 | Odorless | $CH_2(OH)CH_2(OH)CH_2(OH)$ | 93.1 |
| Ethylene glycol monopropylether | −90 | 150 | mild ethereal odor | $CH_3CH_2CH_2OCH_2CH_2OH$ | 104.1 |

TABLE 2

| Agent | weight of CDA (g) | Theo. Protons available per molecule | [Agent] (ppm wt) | Theo. Protons available (ppm mol) | Theo. Protons available/(Ti + TEAl) (mol/mol) | Mileage | Run |
|---|---|---|---|---|---|---|---|
| EG | 0.040 | 2 | 54 | 73 | 1.28 | 0.12 | 1 |
| EG | 0.010 | 2 | 14 | 18 | 0.32 | 0.95 | 2 |
| PG | 0.050 | 2 | 68 | 75 | 1.31 | 0.23 | 3 |
| PG | 0.010 | 2 | 14 | 15 | 0.26 | 0.97 | 4 |
| EP | 0.140 | 1 | 189 | 76 | 1.34 | 0.00 | 5 |
| EP | 0.040 | 1 | 54 | 22 | 0.38 | 0.60 | 6 |
| IPA | 0.080 | 1 | 108 | 76 | 1.33 | 0.00 | 7 |
| IPA | 0.037 | 1 | 50 | 35 | 0.61 | 0.56 | 8 |
| IPA | 0.015 | 1 | 20 | 14 | 0.25 | 0.90 | 9 |
| IPA | 0.002 | 1 | 2 | 1 | 0.02 | 0.95 | 10 |
| $H_2O$ | 0.019 | 2 | 25 | 117 | 2.05 | 0.63 | 11 |
| $H_2O$ | 0.015 | 2 | 20 | 95 | 1.66 | 0.72 | 12 |
| $H_2O$ | 0.001 | 2 | 1 | 6 | 0.11 | 0.93 | 13 |

Example 2B

In this example, the effect of adding a CDA during polymerization was determined. These experiments are also referred to as "polymerization quench" experiments. The zipperclave reactor was charged with propylene (≈400 g) and hydrogen (0.09 mol % of total propylene). The vessel containing the hexane slurry of catalyst, TEA1, and CMDS donor was then connected and flushed into the reactor with propylene (≈340 g). After 20 minutes, the vessel containing the CDA was then connected and flushed into the reactor with propylene (≈100 g). After another 20 minutes of polymerization the polymer was weighed. The necessary control reactions were carried out with no CDA to determine the yield of polymer at 20 and 40 minutes.

Figure 2:
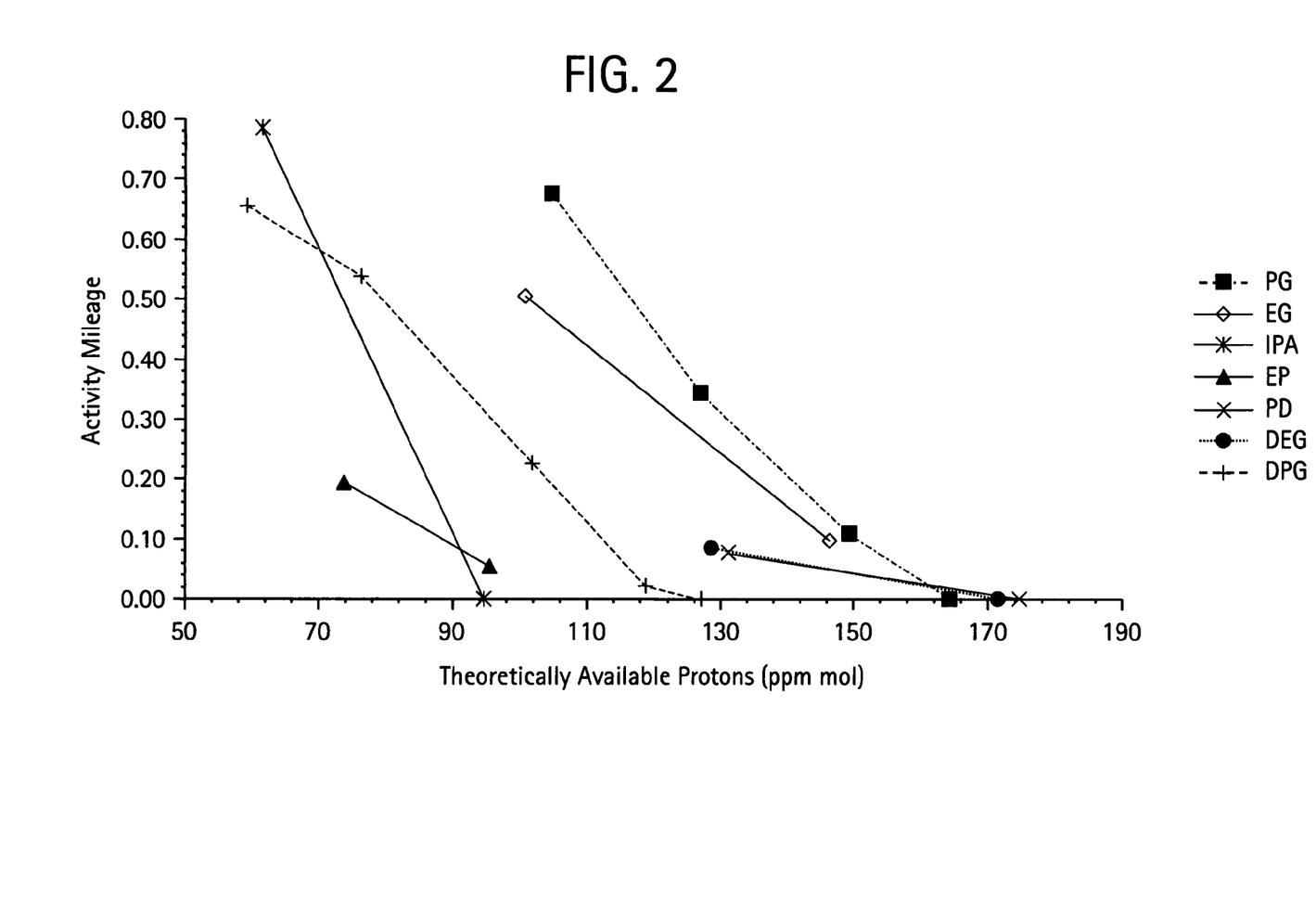
FIG. 2 is a graph of the influence of the CDA concentration on catalyst productivity mileage when the CDA is added during polymerization

The result of this battery of experiments, Table 3, in stopping polymerization shows the following order of ability: EP, IPA>EG, PG where EP and IPA displayed an equal ability to quench the reaction. EG and PG also displayed an equal ability to quench the reaction however their ability to quench the reaction was lower than that of either PP or IPA. Note that the theoretical number of protons on each CDA molecule is used in the calculation of theoretical proton concentration available. For instance, EG has two protons per molecule therefore using 80 milligrams of EG in 740 grams of propylene there are 73 mmol of EG and 147 mmol of protons in the polymerization reactor. Therefore, if all protons were indeed involved in quenching the polymerization reaction then all of the CDAs should hold the same quenching ability. However, all of the CDAs do not have the same quenching ability, FIG. 2. It can be said that not all of the available protons of EG and PG are being utilized as efficiently as those of IPA and EP.

TABLE 3

| Agent | Weight of Agent (g) | [Agent] (ppm mol) | Theo. protons available (ppm mol) | Theo. protons available/(Ti + TEAl) (mol/mol) | Experiment | Mileage |
|---|---|---|---|---|---|---|
| BASELINE EXPERIMENTS - 20 minutes - 147 g yield | | | | | 14 | |
| BASELINE EXPERIMENTS - 40 minutes - 240 g yield | | | | | 15 | |
| EG | 0.080 | 73 | 147 | 2.57 | 16 | 0.10 |
| EG | 0.055 | 50 | 101 | 2.88 | 8 | 0.51 |
| PG | 0.110 | 82 | 164 | 2.22 | 17 | 0.00 |
| PG | 0.100 | 75 | 149 | 1.83 | 18 | 0.11 |
| PG | 0.085 | 64 | 127 | 1.67 | 19 | 0.34 |
| PG | 0.070 | 52 | 105 | 1.29 | 20 | 0.68 |
| EP | 0.175 | 96 | 96 | 1.66 | 21 | 0.05 |
| EP | 0.135 | 74 | 74 | 1.33 | 22 | 0.19 |
| IPA | 0.100 | 95 | 95 | 1.66 | 23 | 0.00 |
| IPA | 0.080 | 76 | 76 | 1.33 | 24 | 0.04 |
| IPA | 0.065 | 62 | 62 | 1.08 | 25 | 0.78 |

Based on the protons that are available, the PG is not as efficient in quenching the polymerization as it should be if in fact both available protons were involved. It is assumed that WPA utilizes each proton in effecting a quench, thus PG should need only half the molecules or identical theoretical protons available. From, FIG. 2 it can be derived that only approximately 1.25 of the 2.0 protons on PG is affecting the catalyst mileage. If both of the protons on PG had been active in affecting the catalyst mileage, then the lines in FIG. 2 would overlap. The lines were fitted to find that IPA has about 1.7 times the effectiveness of PG on a per mole of theoretical proton basis. For example, IPA can produce a catalyst mileage of 0.20 with 80 ppm of the theoretical protons available while it takes PG 140 ppm of the theoretically available protons to get a 0.20 mileage.

Figure 3:
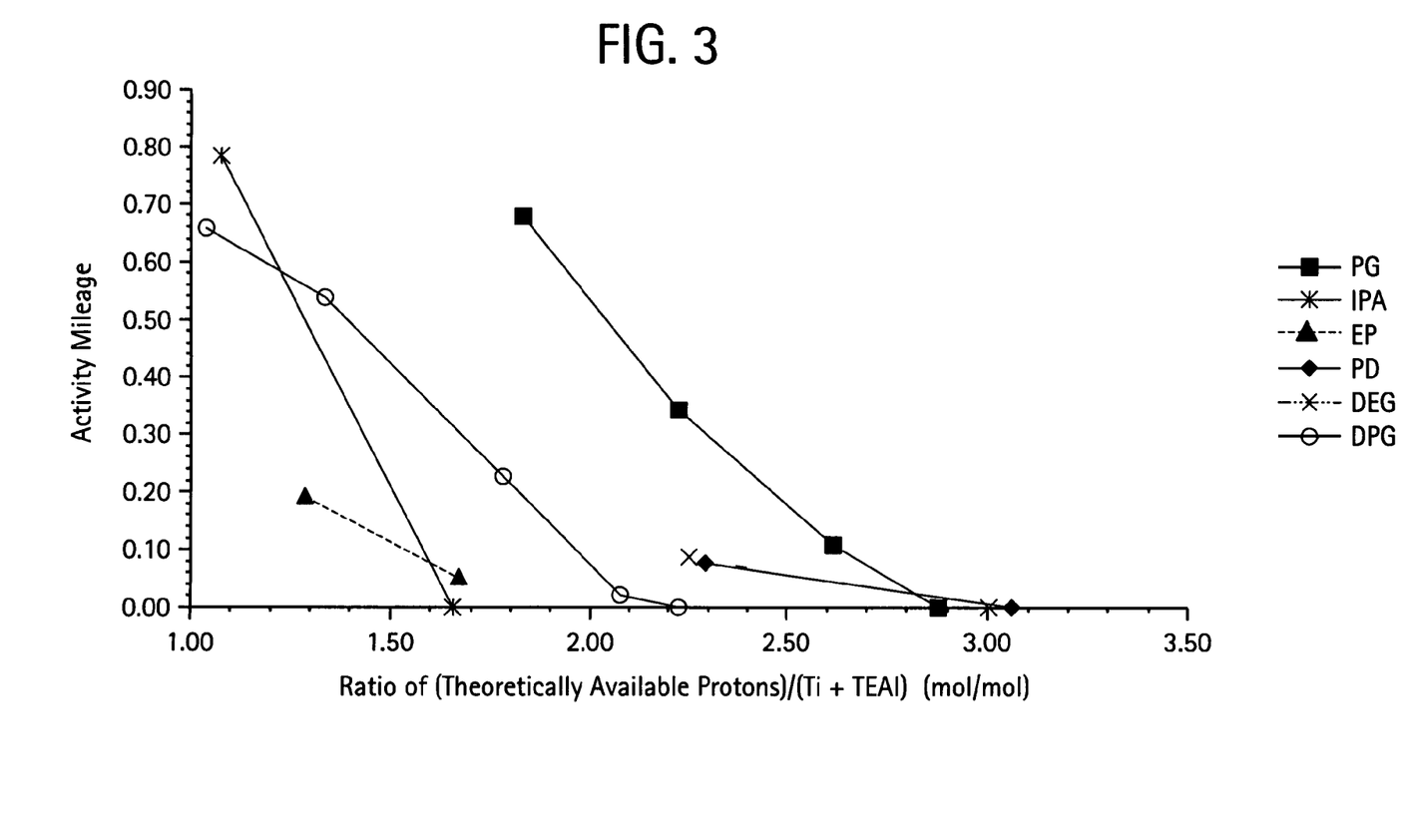
FIG. 3 is a graph of the ratio of theoretical protons available to titanium and TEA1 versus catalyst mileage when the: CDA is added during polymerization.

The efficiency of these various CDAs was also determined by calculating the ratio of theoretically available protons to the concentration of reaction sites, FIG. 3. The results demonstrate that the PG requires more theoretical protons to achieve the same quench level of IPA or EP. Thus PG may not be as efficient as those on IPA or EP in terms of the number of available protons per molecule.

Example 3

A trial of propylene glycol as the CDA was conducted during production of a PP resin to determine its ability to stop the polymerization reaction and cause the aluminum quench product to remain with the fluff. Insofar as stopping the polymerization reaction, indicators of insufficient TEA1 quench were considered throughout the trial and all of the following indicate the TEA1 is being quenched:

- The pressure difference between the wash column and the reactor (delta P) was constant.
- The temperature difference between the top and bottom of the wash column (delta T) was constant.

Delta P and T are pressure/temperature differences between the two detectors.

- The concentration of xylene solubles (XS) material in the fluff was normal in consideration of the external donor level utilized. Due to continuing reaction in the wash column without any external donor present, the XS would rise if there were an insufficient quench.
- The pellet color did not change. If active Al—C moieties from $AlEt_3$ persisted in the resin, it is expected that the pellets would be discolored.

Fluff samples were gathered before and during the trial to determine the concentration of aluminum. After switching from the incumbent quench agent to PG during the production of the PP, the concentration of aluminum in the fluff increased from approximately 25 ppm to approximately 55 ppm (60% of theoretical) within 36 hours.

Example 4

An investigation of the exothermic character of trisisopropoxide aluminium, $Al(OiPr)_3$, and $Al_2(OCH(CH_3)CH_2O)_3$ mixtures was carried out. The aluminum alkoxides were subjected to hydrolysis both in hexane solution and as dry samples. Upon hydrolysis in hexane solution, no difference in exothermicity was observed between the two alkoxide species, $Al(OiPr)_3$ and $Al_2(OCH(CH_3)CH_2O)_3$. Only a small temperature increase was observed for each. As the temperature change was minimal an experiment utilizing a mixture of the alkoxides was not carried out. In the solid state, very little difference in exothermicity was observed between the two alkoxide species upon hydrolysis. The $Al_2(OCH(CH_3)CH_2O)_3$ complex does seem to be slightly more exothermic upon exposure to air. Upon addition of water, no difference between the two species is found. The behavior of the mixture of the two alkoxides was not significantly different from the discrete compounds.

Various product characterization investigations on pellet/fluff samples of polypropylene produced with IPA and PG were conducted. The results demonstrated that PP produced with IPA and PG passed corrosion tests such as those known to one skilled in the art, such as for example a silver mirror pitting test. Furthermore, during extrusion, no smoking or odor was noted for either sample. The sheet samples produced were subjected to odor testing with the results being generally that the smell is different, but not objectionable. No differences in color or MFR stability between the IPA and the PG quenched material were observed in a regrind study. Additionally, PP fluff made with IPA and PG was compounded with typical clarified formulation and the PG quenched resin was found to be slightly hazier than IPA quenched resin although no differences were noted in pressure rise experiments where the extrusion back pressures were monitored.

With regard to the location of the aluminum alkoxide quench product, the dryer beds appear to be uninfluenced, a large proportion of aluminum remains with fluff (low volatility quench product), corrosion issues are presumed to be minimal, and the resin attributes appear to be essentially unchanged.

Example 5

A second trial of propylene glycol as the CDA was conducted during PP resin production to determine its ability to stop the polymerization reaction and cause the aluminum quench product to remain with the fluff Propylene glycol was used at a level of 3.1 molar equivalents relative to TEAL during production. Use of IPA in production of the PP resulted in aluminum levels in the fluff of ≈45 ppm (≈45% of theoretical) and then use of PG resulted in aluminum levels of ≈90 ppm, which approaches the theoretical level of aluminum possible in the fluff As observed in the first trial, the polymerization reaction was stopped as indicated by the constant delta P between the wash column and the reactor, the constant delta T between the top and bottom of the wash column, the XS of the fluff was normal, and the pellet color did not change. The dryer beds appear to be uninfluenced and a large proportion of aluminum remains with the fluff. Various product characterization investigations were conducted on pellet/pluff samples and no deleterious effects were observed.

Example 6

Three heavy alcohols were examined as possible CDAs; di(propylene glycol), di(ethylene glycol), and 1,5-pentanediol. The quench product, the aluminum alkoxide, with respect to physical state and solubility in hydrocarbons was considered, as was the ability of the CDA to stop and prevent any further polymerization.

TABLE 4

| Alkoxide/Alcohol | MP of alcohol (° C.) | BP of alcohol (° C.) | Formula | Protons per molecule | MW of alcohol |
|---|---|---|---|---|---|
| Methanol | −98 | 65 | $CH_3OH$ | 1 | 32.0 |
| Ethanol | −114 | 78 | $CH_3CH_2OH$ | 1 | 46.1 |
| n-Propanol | −126 | 97 | $CH_3CH_2CH_2OH$ | 1 | 61.1 |
| iso-Propanol (IPA) | −89 | 82 | $CH_3CH(OH)CH_3$ | 1 | 61.1 |
| ethylene glycol (EG) | −13 | 197 | $HOCH_2CH_2OH$ | 2 | 62.1 |
| t-Butanol | 25 | 83 | $(CH_3)_3COH$ | 1 | 74.1 |
| propylene glycol (PG) | −60 | 187 | $CH_3CH(OH)CH_2(OH)$ | 2 | 77.1 |
| glycerol/glycerin | 18 | 290 | $CH_2(OH)CH_2(OH)CH_2(OH)$ | 3 | 93.1 |
| Ethylene glycol monopropyl ether (EP) | −90 | 150 | $CH_3CH_2CH_2OCH_2CH_2OH$ | 1 | 104.1 |

TABLE 4-continued

| Alkoxide/Alcohol | MP of alcohol (° C.) | BP of alcohol (° C.) | Formula | Protons per molecule | MW of alcohol |
|---|---|---|---|---|---|
| 1,5-pentanediol (PD) | −16 | 242 | HOCH$_2$CH$_2$CH$_2$CH$_2$CH$_2$OH | 2 | 104.5 |
| di(ethylene glycol) (DEG) | −10 | 245 | HOCH$_2$CH$_2$OCH$_2$CH$_2$OH | 2 | 106.1 |
| di(propylene glycol) (DPG) | −78 | 228 | HOC$_3$H$_6$OC$_3$H$_6$OH | 2 | 134.2 |

To further explore the options available, the possible permutations associated with solubility character of the free alcohol and the subsequent aluminum quench products were considered, Table 5. Alcohol solubility was quantitatively assessed by GC analysis of mixtures where the solvent was hexane. No significant differences in relative character were encountered when 1-hexene was used as the solvent. Although, the polar character of the alkene does increase its solubilizing ability with the molecules used in this study, it can be assumed that hexane acts as a representative of propylene in solubilizing the alcohols and aluminum quench products. Aluminum alkoxide (quench product) solubility was assessed by visual inspection of hexane solutions.

TABLE 5

| Permutation | Alcohol solubility | Aluminum quench product solubility | Predicted concentration of aluminum in the fluff | Representative Agent |
|---|---|---|---|---|
| I | High | High | Low | EP |
| II | High | Moderate | Moderate | IPA |
| III | High | Low | High | — |
| IV | Moderate | High | Low | DPG |
| V | Moderate | Moderate | Moderate | — |
| VI | Moderate | Low | High | — |
| VII | Low | High | Low | — |
| VIII | Low | Moderate | Moderate | DEG |
| IX | Low | Low | High | EG, PD, PG |

The set of permutations (I, II, IV, V) that involve at least moderate solubility of both the free alcohol and the resultant aluminum quench product include EP, IPA, and DPG.

Thus, it is expected that low solubility solids would be advantageous in the production process due to their propensity to stay with the fluff. This was further established with the use of PG such that the level of aluminum in the fluff markedly increased in comparison to IPA usage.

As expected from the high solubility of IPA and EP in hexane, the subsequent aluminum alkoxides are also quite soluble in hexane, if not more so. Holding the number of hydroxyl groups constant while increasing the molecular weight of the CDA increases its solubility in hydrocarbons. The production of a quench product that is a liquid and is soluble in propylene suggests that it will be present in overhead streams, but its influence on mechanical components cannot be predicted.

To test the viability of a moderately soluble alcohol and aluminum quench product, EP or DPG can be utilized. The latter choice is more desirable based on the aforementioned constraints (organoleptics, safety, etc.).

Included in permutation IX, the free alcohol, PD, is insoluble in hexane as is its aluminum quench product. Recall that PG also shows very low solubility in hexane and its aluminum quench product is also quite insoluble in hexane. Again, extending is behavior in hexane to expectations in propylene it remains that PG performed quite well in keeping over 90% of the aluminum with the fluff. Under the current level of understanding, it is expected that EG, PD, and PG would behave similarly as CDAs.

It would be advantageous to utilize an alcohol that holds relatively high solubility in hydrocarbons, yet the aluminum quench product remains with the fluff, represented by permutation VI. A simple molecule with these attributes is most likely nonexistent due to the reversal of solubility character required.

Example 7

A representative experiment with di(propylene glycol) follows: Under argon, a round bottom flask was charged with TEA1(6.7 mmol, 0.76 g), hexane (10 mL), and a stir bar and then cooled with an ice-water bath. A vigorous reaction took place as the di(propylene glycol) (10 mmol, 1.34 g) was added drop-wise with stirring and the ethane was vented to the Schlenk line. No solid formed at any time during the reaction. The solvent was then removed in vacuo to leave a viscous clear liquid.

Example 8

Polymerization with CDA added midway through polymerization—"Polymerization Quench": The zipperclave reactor was charged with propylene (≈400 g) and hydrogen (0.09 mol % of total propylene). The vessel containing the hexane slurry of catalyst (10 mg, Toho A), TEA1 (1 mmol), and CMDS donor (0.05 mmol CMDS) was then connected and flushed into the reactor with propylene (≈340 g), reaction temperature of 70° C. After 20 minutes, the vessel containing the CDA was then connected and flushed into the reactor with propylene (≈100 g). After another 20 minutes of polymerization the polymer was weighed. The necessary control reactions were carried out with no CDA to determine the yield of polymer at 20 and 40 minutes.

The result of this battery of experiments in stopping polymerization based on moles of protons available Table 6, in conjunction with previous results in Table 3 shows the following order of ability: EP>IPA>DPG>DEG, PD>EG, PG.

TABLE 6

| Agent | weight of Agent (g) | [Agent] (ppm mol) | [Agent] (ppm wt) | Theo. protons available (ppm mol) | Agent/ TEAl (mol/ mol) | Activity Mileage |
|---|---|---|---|---|---|---|
| PD | 0.160 | 87 | 216 | 175 | 1.5 | 0.00 |
| PD | 0.120 | 66 | 162 | 131 | 1.2 | 0.08 |
| DEG | 0.160 | 86 | 216 | 171 | 1.5 | 0.00 |
| DEG | 0.120 | 64 | 162 | 129 | 1.1 | 0.09 |
| DPG | 0.150 | 64 | 203 | 127 | 1.1 | 0.00 |
| DPG | 0.120 | 51 | 162 | 102 | 0.9 | 0.23 |
| DPG | 0.090 | 38 | 122 | 76 | 0.7 | 0.54 |

Note that the theoretical number of protons on each CDA molecule is used in the calculation of theoretical proton concentration available. This considered, it is interesting to note that if all protons were indeed involved in quenching the polymerization reaction all of the CDAs should hold the same quenching ability however this is not the case. It can be said that not all of the available protons of the diols (e.g. EG and PG) are being utilized as efficiently as those of the monoprotic molecules (PA and EP). It is assumed that IPA utilizes each proton in effecting a quench, thus EG should need only half the molecules or identical theoretical protons available. From FIG. 3, it can be derived that only approximately 1.35 of the 2.0 protons on EG are effecting the catalyst mileage. The most efficient diol is DPG, such that IPA has only about 1.2 times the effectiveness.

Example 9

Figure 4:
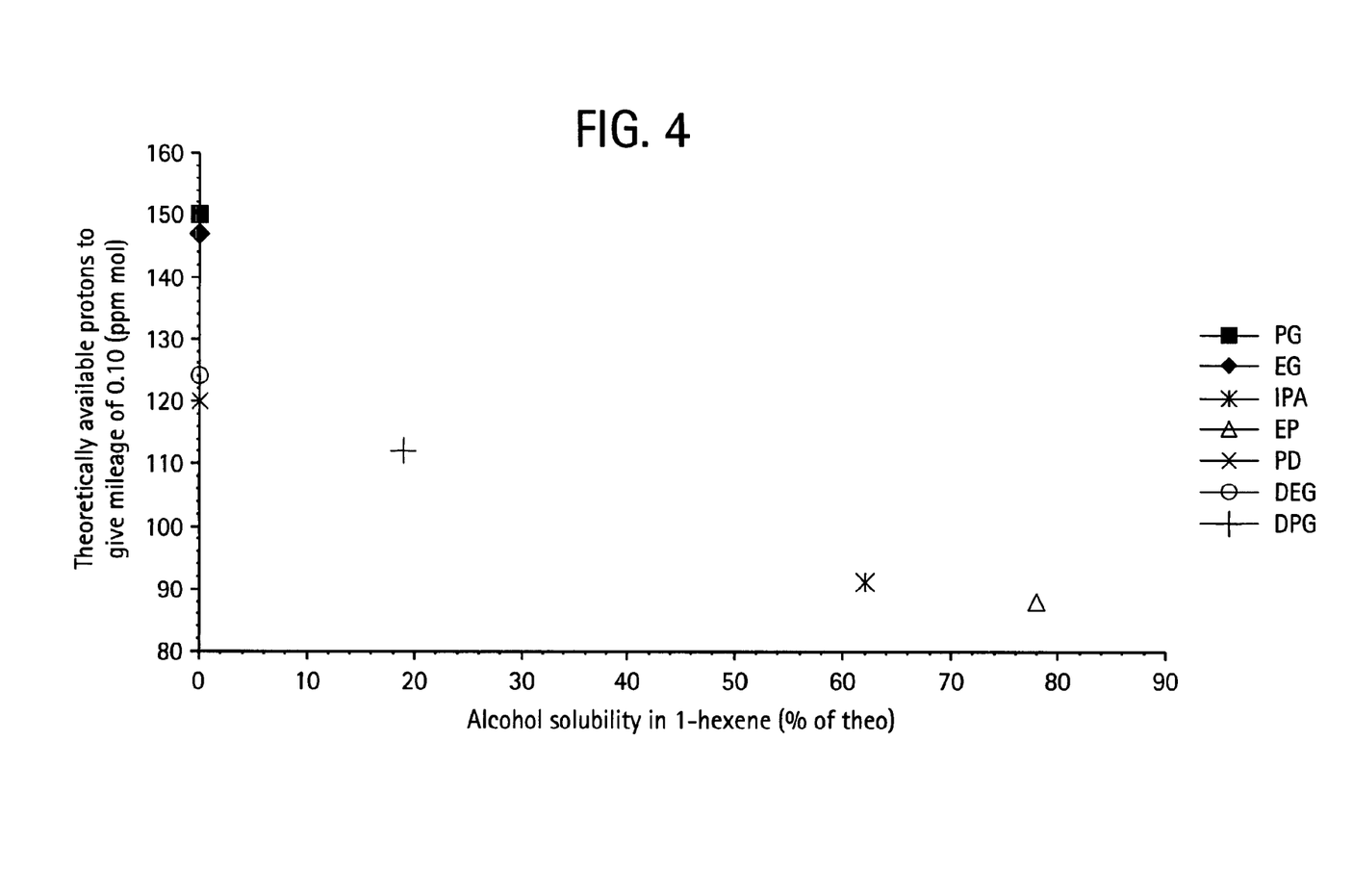
FIG. 4 is a graph of the influence of catalyst deactivation agent solubility on catalyst mileage.

The amount of CDA required to generate a 90% polymerization kill (in propylene) was compared with the solubility of the CDA (in hexane), FIG. 4. The more soluble species, IPA and EP, both monoprotic, show a higher efficiency than the less soluble, diprotic CDAs. The more hydrophilic diol molecules, DEG, EG, PD, and PG are presumed to be relatively insoluble in the propylene reaction medium. Increasing the molar ratio of quench agent to TEA1 compensated for the lower protic efficiency of PG. The quantification of polymerization cessation is used as a measure of TEA1 consumption by the CDA.

Example 10

Dipropylene glycol (DPG) was evaluated as a CDA. The DPG utilized during this trial was obtained from two different sources; DOW, LO+ grade and Lyondell, fragrance grade. The isomeric composition of these two supplies of DPG was somewhat different, but testing as previously described did not show a difference in quench efficiency. The DPG molecule was utilized at a 1.9 molar ratio relative to $AlEt_3$ throughout the trial.

Immediately preceding use of DPG, isopropanol was in use during production of a PP homopolymer. Samples were collected for analysis of the aluminum content. The results demonstrate that IPA results in only about 45% of the aluminum remaining with the fluff. Indicators of an effective cocatalyst quench (e.g. delta T across the wash column) were also present.

Example 11

Further information concerning the path that DPG and the aluminum glycoxide product follow in the polymerization process was gathered through analysis of the aluminum content in the different outputs from the polymerization reactor system, which was similar to that given as an embodiment in FIG. 1. The two main paths for DPG/aluminum glycoxide would be to travel out with the fluff and be carried out of the top of the wash column to the distillation column. The amount of aluminum glycoxide in the fluff was easily calculated by analysis of the fluff for the presence of aluminum. The amount of aluminum found in the fluff during DPG use is ≈65% of theoretical. The path starting at the wash column overhead would involve traveling through the recycle compressor and then to the distillation column, where it could then go out the top or out the bottom. The material exiting the top of the column, mainly propylene, enters the feed tank then travels through the feed dryers and finally is reintroduced into the reactor as recycle propylene, The sample of liquid propylene taken before the dryer beds, composed only of recycle propylene (no fresh propylene had been added), was introduced into an aqueous solution with an internal standard (EP) and analyzed by gas chromatography.

This propylene sample did not have any measurable DPG, the limit of detection is estimated to be <1 ppm. The absence of CDA reaching the dryer beds would be advantageous, as the interval between regenerations would be extended. A sample of material taken from the bottom of the distillation column, mainly high boiling material, atactic PP, and some propylene, was extracted with a water solution containing EP as an internal standard and analyzed by GC to show approximately 400 ppm of DPG.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of deactivating a polymerization catalyst system comprising contacting the catalyst system with a catalyst deactivation agent downstream of a loop reactor and upstream of a polymer recovery system, wherein the catalyst system comprises an alkyl aluminum cocatalyst and the catalyst deactivation agent reduces the catalyst system activity by greater than 90%, and wherein the catalyst deactivation agent is a diol, glycerin, a mono-hydroxy derivative of a glycol, or combinations thereof.

2. The method of claim 1 wherein the polymerization catalyst system is a Ziegler-Natta catalyst system.

3. The method of claim 1 wherein the polymerization catalyst system is a metallocene catalyst system.

4. The method of claim 1 wherein the alkyl aluminum cocatalyst is triethylaluminum, trimethyl aluminum, triisobutyl aluminum or combinations thereof.

5. The method of claim 1 wherein the diol is ethylene glycol, propylene glycol, diethylene glycol, dipropylene glycol, tetrapropylene glycol, hexaethylene glycol, decapropylene glycol, or combinations thereof.

6. The method of claim 1 wherein the reaction of the catalyst system and catalyst deactivation agent produces reaction products that are noncorrosive, nongelatinous, or both.

7. The method of claim 6 wherein the nongelationous reaction products remain substantially with a polymerization product.

8. The method of claim 6 wherein the nongelatinous reaction products are distributed between a polymerization product and a liquid process stream.

9. The method of claim 1 wherein the catalyst deactivation agent reacts to produce quench products that are removed by distillation.

10. A method of inhibiting the polymerization of propylene comprising contacting a polymerization catalyst system with a catalyst deactivation agent downstream of a loop reactor and upstream of a polymer recovery system, wherein the catalyst system comprises an alkyl aluminum cocatalyst and the catalyst deactivation agent reduces the catalyst system activity by greater than 90%, and wherein the catalyst deactivation agent is a diol, glycerin, a mono-hydroxy derivative of a glycol, or combinations thereof.

11. The method of claim 10 wherein the diol is ethylene glycol, propylene glycol, diethylene glycol, dipropylene glycol, tetrapropylene glycol, hexaethylene glycol, decapropylene glycol, or combinations thereof.

12. A method of deactivating a polymerization catalyst system having an alkyl aluminum cocatalyst, comprising contacting the catalyst system with a catalyst deactivation agent, wherein said catalyst deactivation agent is a diol, glycerin, a mono-hydroxy derivative of a glycol, or combinations thereof, downstream of a loop reactor and upstream of a polymer recovery system.

13. The method of claim 1 wherein the mono-hydroxy derivative of a glycol is ethylene glycol monomethyl ether, ethylene glycol monopropyl ether, or combinations thereof.

14. The method of claim 10 wherein the mono-hydroxy derivative of a glycol is ethylene glycol monomethyl ether, ethylene glycol monopropyl ether, or combinations thereof.

* * * * *